US009068060B2

(12) United States Patent
Matsuura

(10) Patent No.: US 9,068,060 B2
(45) Date of Patent: Jun. 30, 2015

(54) COMPOSITE AND METHOD FOR PRODUCING THE SAME, RUBBER COMPOSITION, AND PNEUMATIC TIRE

(71) Applicant: SUMITOMO RUBBER INDUSTRIES, LTD., Kobe-shi, Hyogo (JP)

(72) Inventor: Ai Matsuura, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/107,614

(22) Filed: Dec. 16, 2013

(65) Prior Publication Data

US 2014/0194562 A1    Jul. 10, 2014

(30) Foreign Application Priority Data

Jan. 10, 2013   (JP) .................. 2013-002917

(51) Int. Cl.
*B60C 1/00* (2006.01)
*C08F 36/00* (2006.01)
*C08K 5/548* (2006.01)
*B82Y 30/00* (2011.01)

(52) U.S. Cl.
CPC . *C08K 5/548* (2013.01); *B60C 1/00* (2013.01); *B82Y 30/00* (2013.01)

(58) Field of Classification Search
CPC ............ C08K 5/548; C08K 3/36; C60C 1/00; C08L 7/02; B82Y 30/00; B82Y 40/00
USPC .......................................... 524/262; 526/335
See application file for complete search history.

(56) References Cited

U.S. PATENT DOCUMENTS

| | | | |
|---|---|---|---|
| 2,140,527 A | 12/1938 | Haynes et al. | |
| 2,486,720 A | 11/1949 | Perkerson | |
| 2,650,891 A | 9/1953 | Buckwalter | |
| 2,905,567 A * | 9/1959 | Allen | 106/457 |
| 3,709,845 A | 1/1973 | Boustany et al. | |
| 3,716,513 A * | 2/1973 | Burke | 523/351 |
| 3,959,194 A | 5/1976 | Adelmann | |
| 4,508,860 A | 4/1985 | Hawes | |
| 4,835,216 A | 5/1989 | Morikawa et al. | |
| 5,000,092 A | 3/1991 | Best | |
| 5,017,636 A | 5/1991 | Hattori et al. | |
| 5,290,830 A | 3/1994 | Tung et al. | |
| 5,396,940 A | 3/1995 | Segatta et al. | |
| 5,569,740 A | 10/1996 | Tanaka et al. | |
| 5,967,211 A | 10/1999 | Lucas et al. | |
| 6,117,545 A | 9/2000 | Cavaille et al. | |
| 6,306,955 B1 | 10/2001 | Kawasaki et al. | |
| 6,376,587 B1 | 4/2002 | Ajiro et al. | |
| 6,489,389 B1 | 12/2002 | Ohta et al. | |
| 6,703,497 B1 | 3/2004 | Ladouce et al. | |
| 7,427,646 B2 | 9/2008 | Kondou | |
| 8,022,136 B2 | 9/2011 | Yano et al. | |
| 8,163,821 B2 | 4/2012 | Hiro | |
| 8,273,804 B2 | 9/2012 | Nishimura | |
| 8,623,956 B2 | 1/2014 | Sugimoto et al. | |
| 8,633,275 B2 | 1/2014 | Sakaki et al. | |
| 8,658,728 B2 | 2/2014 | Ichikawa et al. | |
| 8,658,730 B2 | 2/2014 | Ichikawa | |
| 8,809,450 B2 | 8/2014 | Sakaki et al. | |
| 8,813,798 B2 | 8/2014 | Tsumori et al. | |
| 8,857,482 B2 | 10/2014 | Taguchi et al. | |
| 8,875,765 B2 | 11/2014 | Tsumori et al. | |
| 2003/0060551 A1 | 3/2003 | Mizuno et al. | |
| 2003/0083516 A1 | 5/2003 | Korth et al. | |
| 2004/0110889 A1 | 6/2004 | Yagi et al. | |
| 2004/0266937 A1 | 12/2004 | Yagi et al. | |
| 2005/0027060 A1 | 2/2005 | Yagi et al. | |
| 2005/0148723 A1 | 7/2005 | Kondou | |
| 2005/0234188 A1 | 10/2005 | Kondou | |
| 2006/0252879 A1 | 11/2006 | Tanaka et al. | |
| 2007/0059232 A1 | 3/2007 | Stenzel et al. | |

(Continued)

FOREIGN PATENT DOCUMENTS

| | | |
|---|---|---|
| CN | 2000-344955 A | 12/2000 |
| CN | 1572825 A | 2/2005 |
| CN | 1692128 A | 11/2005 |
| CN | 1832967 A | 9/2006 |
| CN | 1946744 A | 4/2007 |
| CN | 101270219 A | 9/2008 |
| CN | 102245644 A | 11/2011 |
| CZ | 237729 B1 | 10/1985 |
| EP | 0328261 A1 | 8/1989 |
| EP | 0905188 A1 | 3/1999 |
| EP | 1484359 A1 | 12/2004 |
| EP | 1568713 A1 | 8/2005 |
| EP | 1650253 A1 | 4/2006 |
| EP | 1652862 A1 | 5/2006 |
| EP | 1816144 A1 | 8/2007 |

(Continued)

OTHER PUBLICATIONS

"Shinpan Kobunshi Jiten" (Polymer Dictionary, New Edition), 6th Imp., published Mar. 20, 2001, p. 448, with partial translation of lines 21-30 of the left column of p. 448 (3 pages total).

(Continued)

*Primary Examiner* — William Cheung
(74) *Attorney, Agent, or Firm* — Birch, Stewart, Kolasch & Birch, LLP

(57) ABSTRACT

The present invention aims to provide a composite including a rubber component in which surface-treated silica with a small particle size is uniformly dispersed, and a method for producing the composite. The present invention also aims to provide a rubber composition including the composite, the rubber composition capable of achieving both fuel efficiency and abrasion resistance while having excellent processability. The present invention also aims to provide a pneumatic tire including the rubber composition. The present invention relates to a composite formed from a compound latex prepared by mixing a natural rubber latex and a dispersion of surface-treated silica formed from a water glass, the surface-treated silica having an average particle size of not more than 100 nm and having a chemically-treated surface.

10 Claims, No Drawings

(56) References Cited

U.S. PATENT DOCUMENTS

| | | |
|---|---|---|
| 2007/0100061 A1 | 5/2007 | Hattori et al. |
| 2007/0197688 A1 | 8/2007 | Tsukada et al. |
| 2007/0241480 A1 | 10/2007 | Kanenari et al. |
| 2008/0009570 A1 | 1/2008 | Miyazaki |
| 2008/0185087 A1 | 8/2008 | Galimberti et al. |
| 2009/0000721 A1 | 1/2009 | Imoto et al. |
| 2009/0088496 A1 | 4/2009 | Miyasaka et al. |
| 2009/0099281 A1 | 4/2009 | Sakurai et al. |
| 2010/0076118 A1 | 3/2010 | Yano et al. |
| 2010/0206444 A1 | 8/2010 | Kawasaki |
| 2010/0294407 A1 | 11/2010 | Kushida |
| 2011/0094648 A1 | 4/2011 | Horiguchi |
| 2011/0094649 A1 | 4/2011 | Miyazaki |
| 2011/0136939 A1 | 6/2011 | Lechtenboehmer et al. |
| 2011/0166254 A1 | 7/2011 | Nishimura |
| 2011/0178235 A1 | 7/2011 | Sugimoto |
| 2011/0184118 A1 | 7/2011 | Sugimoto et al. |
| 2011/0230613 A1 | 9/2011 | Hiro |
| 2011/0253285 A1 | 10/2011 | Ichikawa et al. |
| 2011/0294949 A1 | 12/2011 | Sakaki et al. |
| 2012/0214911 A1 | 8/2012 | Yano et al. |
| 2013/0030083 A1 | 1/2013 | Taguchi et al. |
| 2013/0066021 A1 | 3/2013 | Ichikawa et al. |
| 2013/0098523 A1 | 4/2013 | Tsumori et al. |
| 2013/0102722 A1 | 4/2013 | Tsumori et al. |
| 2013/0123387 A1 | 5/2013 | Kagawa et al. |

FOREIGN PATENT DOCUMENTS

| | | |
|---|---|---|
| EP | 2072574 A1 | 6/2009 |
| EP | 2154192 A1 | 2/2010 |
| EP | 2223928 A1 | 9/2010 |
| EP | 2 284 022 A1 | 2/2011 |
| EP | 2 333 009 A1 | 6/2011 |
| EP | 2333008 A1 | 6/2011 |
| EP | 2 366 558 A1 | 9/2011 |
| EP | 2377892 A1 | 10/2011 |
| EP | 2476708 A1 | 7/2012 |
| EP | 2615127 A2 | 7/2013 |
| GB | 164392 A | 6/1921 |
| GB | 240939 A | 10/1925 |
| JP | 4-356205 A | 12/1992 |
| JP | 5-301994 A | 11/1993 |
| JP | 6-87306 A | 3/1994 |
| JP | 6-329702 A | 11/1994 |
| JP | 6-329838 A | 11/1994 |
| JP | 7-149955 A | 6/1995 |
| JP | 7-196850 A | 8/1995 |
| JP | 8-12814 A | 1/1996 |
| JP | 8-143606 A | 6/1996 |
| JP | 11-12306 A | 1/1999 |
| JP | 11-78437 A | 3/1999 |
| JP | 11-129711 A | 5/1999 |
| JP | 11-222012 A | 8/1999 |
| JP | 11-513425 A | 11/1999 |
| JP | 2000-95898 A | 4/2000 |
| JP | 2001-114939 A | 4/2001 |
| JP | 2002-155164 A | 5/2002 |
| JP | 3294901 B2 | 6/2002 |
| JP | 2002-524618 A | 8/2002 |
| JP | 2002-338734 A | 11/2002 |
| JP | 2003-64221 A | 3/2003 |
| JP | 2003-94918 A | 4/2003 |
| JP | 2003-320804 A | 11/2003 |
| JP | 2004-59803 A | 2/2004 |
| JP | 2004-67027 A | 3/2004 |
| JP | 2004-91715 A | 3/2004 |
| JP | 2004-182905 A | 7/2004 |
| JP | 2004-250546 A | 9/2004 |
| JP | 2004-262973 A | 9/2004 |
| JP | 2004-359773 A | 12/2004 |
| JP | 2005-41960 A | 2/2005 |
| JP | 2005-68240 A | 3/2005 |
| JP | 2005-75856 A | 3/2005 |
| JP | 2005-82622 A | 3/2005 |
| JP | 2005-82766 A | 3/2005 |
| JP | 2005-126604 A | 5/2005 |
| JP | 2005-133025 A | 5/2005 |
| JP | 2005-325206 A | 11/2005 |
| JP | 2005-325307 A | 11/2005 |
| JP | 2006-16622 A | 1/2006 |
| JP | 2006-36926 A | 2/2006 |
| JP | 2006-96926 A | 4/2006 |
| JP | 2006-104455 A | 4/2006 |
| JP | 2006-152045 A | 6/2006 |
| JP | 2006-152171 A | 6/2006 |
| JP | 2006-152211 A | 6/2006 |
| JP | 2006-206837 A | 8/2006 |
| JP | 2006-206864 A | 8/2006 |
| JP | 2006-281744 A | 10/2006 |
| JP | 2006-307018 A | 11/2006 |
| JP | 2007-131730 A | 5/2007 |
| JP | 2007-145898 A | 6/2007 |
| JP | 2007-169431 A | 7/2007 |
| JP | 2008-106099 A | 5/2008 |
| JP | 2008-158446 A | 7/2008 |
| JP | 2008-214608 A | 9/2008 |
| JP | 2008-308615 A | 12/2008 |
| JP | 2009-1680 A | 1/2009 |
| JP | 2009-13196 A | 1/2009 |
| JP | 2009-13197 A | 1/2009 |
| JP | 2009-51955 A | 3/2009 |
| JP | 2009-67929 A | 4/2009 |
| JP | 2009-84564 A | 4/2009 |
| JP | 2009-108308 A | 5/2009 |
| JP | 2009-191132 A | 8/2009 |
| JP | 2009-191198 A1 | 8/2009 |
| JP | 2009-202865 A | 9/2009 |
| JP | 2009-262835 A | 11/2009 |
| JP | 2010-70747 A | 4/2010 |
| JP | 2010-111785 A | 5/2010 |
| JP | 2010-138359 A | 6/2010 |
| JP | 2010-144001 A | 7/2010 |
| JP | 2010-173513 A | 8/2010 |
| JP | 2010-174169 A | 8/2010 |
| JP | 2010-242023 A | 10/2010 |
| JP | 2010-248282 A | 11/2010 |
| JP | 4581116 B2 | 11/2010 |
| JP | 2010-275642 A | 12/2010 |
| JP | 2011-63851 A | 3/2011 |
| JP | 2011-153221 A | 8/2011 |
| JP | 2011-153222 A | 8/2011 |
| JP | 2011-157473 A | 8/2011 |
| JP | 2011-225680 A | 11/2011 |
| JP | 2011-231214 A | 11/2011 |
| JP | 2011-256311 A | 12/2011 |
| JP | 2012-1571 A | 1/2012 |
| WO | WO 03/082925 A1 | 10/2003 |
| WO | WO 2005/012365 A1 | 2/2005 |
| WO | WO 2005/092971 A1 | 10/2005 |
| WO | WO 2009/096113 A1 | 8/2009 |
| WO | WO 2010/071106 A1 | 6/2010 |
| WO | WO 2011/049162 A1 | 4/2011 |
| WO | WO 2011/096399 A1 | 8/2011 |

OTHER PUBLICATIONS

Database WPI Week 200570, Thomson Scientific, London, GB; AN 2005-684076, XP-002673748, Apr. 18, 2012, 2 pages.
Extended European Search Report, dated Aug. 27, 2010, for European Application No. 08830800.2.
Food Chemicals Codex, 7th Edition, Calcium Lignosulfonate, p. 142, 2010.
International Search Report for International Application No. PCT/JP2009/070824, dated Mar. 9, 2010.
International Search Report for International Application No. PCT/JP2011/063248, dated Sep. 13, 2011.
Japanese Office Action for Japanese Application No. 2008-318710, dated Mar. 9, 2010.
Japanese Office Action for Japanese Application No. 2008-318711, dated Mar. 9, 2010.

(56) References Cited

OTHER PUBLICATIONS

Japanese Office Action for Japanese Application No. 2009-019711, dated Mar. 9, 2010.
Rhodia, "Rhodia Silcea launches Zeosil® Premium, a new generation of high surface-area silica offering lower resistance and greater performance," Rhodia Silica News Release, Solvay-Rhodia, Lyon, France, Feb. 27, 2007, 3 pages.
The Chemical Society of Japan, "Hyojun Kagaku Yogo Jiten" (Standard Dictionary of Chemical Terms), 2nd Ed., published Mar. 31, 2005, pp. 672-673, with partial translation of lines 5-9 of the left column of p. 673 (3 pages total).
Tokai Carbon Co., Ltd., "Seast So (FEF)", Physicochemical Properties, Product Information, retrieved Feb. 20, 2014, 3 pages, http://www.tokaicarbon.co.jp/en/products/carbon_b/seast/.
U.S. Notice of Allowance for U.S. Appl. No. 12/983,338, dated Feb. 14, 2012.
U.S. Notice of Allowance for U.S. Appl. No. 13/006,606, dated Oct. 7, 2014.
U.S. Notice of Allowance for U.S. Appl. No. 13/013,849, dated Aug. 28, 2013.
U.S. Notice of Allowance for U.S. Appl. No. 13/048,914, dated Feb. 1, 2012.
U.S. Notice of Allowance for U.S. Appl. No. 13/117,182, dated Sep. 9, 2013.
U.S. Notice of Allowance for U.S. Appl. No. 13/139,536, dated Dec. 4, 2013 (Supplemental Notice of Allowability).
U.S. Notice of Allowance for U.S. Appl. No. 13/139,536, dated Oct. 18, 2013.
U.S. Notice of Allowance for U.S. Appl. No. 13/350,407, dated Apr. 23, 2014.
U.S. Notice of Allowance for U.S. Appl. No. 13/560,090, dated Jun. 17, 2014.
U.S. Notice of Allowance for U.S. Appl. No. 13/616,310, dated Aug. 27, 2014.
U.S. Notice of Allowance for U.S. Appl. No. 13/616,310, dated Oct. 1, 2014 (Corrected Notice of Allowability).
U.S. Notice of Allowance for U.S. Appl. No. 13/776,126, dated Dec. 26, 2013.
U.S. Notice of Allowance for U.S. Appl. No. 14/013,286, dated Dec. 29, 2014.
U.S. Office Action for U.S. Appl. No. 12/983,338, dated Mar. 23, 2011.
U.S. Office Action for U.S. Appl. No. 12/983,338, dated Sep. 15, 2011.
U.S. Office Action for U.S. Appl. No. 13/006,606, dated May 9, 2013.
U.S. Office Action for U.S. Appl. No. 13/006,606, dated Oct. 10, 2012.
U.S. Office Action for U.S. Appl. No. 13/013,849, dated Mar. 13, 2013.
U.S. Office Action for U.S. Appl. No. 13/048,914, dated Sep. 19, 2011.
U.S. Office Action for U.S. Appl. No. 13/117,182, dated Feb. 5, 2013.
U.S. Office Action for U.S. Appl. No. 13/117,182, dated May 17, 2013.
U.S. Office Action for U.S. Appl. No. 13/139,536, dated Jan. 27, 2012.
U.S. Office Action for U.S. Appl. No. 13/139,536, dated Jul. 10, 2013.
U.S. Office Action for U.S. Appl. No. 13/139,536, dated Jun. 29, 2012.
U.S. Office Action for U.S. Appl. No. 13/139,536, dated Mar. 14, 2013.
U.S. Office Action for U.S. Appl. No. 13/139,536, dated Oct. 12, 2012.
U.S. Office Action for U.S. Appl. No. 13/139,536, dated Oct. 27, 2011.
U.S. Office Action for U.S. Appl. No. 13/350,407, dated Jan. 17, 2013.
U.S. Office Action for U.S. Appl. No. 13/350,407, dated May 23, 2013.
U.S. Office Action for U.S. Appl. No. 13/350,407, dated Oct. 23, 2013.
U.S. Office Action for U.S. Appl. No. 13/560,090, dated Aug. 2, 2013.
U.S. Office Action for U.S. Appl. No. 13/560,090, dated Mar. 4, 2014.
U.S. Office Action for U.S. Appl. No. 13/560,090, dated Nov. 12, 2013.
U.S. Office Action for U.S. Appl. No. 13/616,310 dated May 7, 2014.
U.S. Office Action for U.S. Appl. No. 13/616,310, dated Nov. 4, 2013.
U.S. Office Action for U.S. Appl. No. 13/672,880, dated Jun. 13, 2014.
U.S. Office Action for U.S. Appl. No. 13/672,880, dated Mar. 28, 2013.
U.S. Office Action for U.S. Appl. No. 13/672,880, dated Sep. 13, 2013.
U.S. Office Action for U.S. Appl. No. 13/699,533, dated Jan. 15, 2015.
U.S. Office Action for U.S. Appl. No. 13/699,533, dated Jun. 23, 2014.
U.S. Office Action for U.S. Appl. No. 13/739,796, dated Feb. 27, 2014.
U.S. Office Action for U.S. Appl. No. 13/739,796, dated Jan. 28, 2015.
U.S. Office Action for U.S. Appl. No. 13/739,796, dated Jul. 11, 2014.
U.S. Office Action for U.S. Appl. No. 13/739,796, dated Sep. 24, 2014.
U.S. Office Action for U.S. Appl. No. 13/748,168, dated Aug. 1, 2014.
U.S. Office Action for U.S. Appl. No. 13/748,168, dated May 7, 2014.
U.S. Office Action for U.S. Appl. No. 13/748,168, dated Nov. 6, 2014.
U.S. Office Action for U.S. Appl. No. 13/752,507, dated Aug. 14, 2014.
U.S. Office Action for U.S. Appl. No. 13/752,507, dated Dec. 17, 2014.
U.S. Office Action for U.S. Appl. No. 13/752,507, dated Jan. 29, 2015.
U.S. Office Action for U.S. Appl. No. 13/752,507, dated Mar. 14, 2014.
U.S. Office Action for U.S. Appl. No. 13/752,711, dated Dec. 26, 2014.
U.S. Office Action for U.S. Appl. No. 13/752,711, dated Jun. 5, 2014.
U.S. Office Action for U.S. Appl. No. 13/752,711, dated Mar. 17, 2014.
U.S. Office Action for U.S. Appl. No. 13/752,711, dated Sep. 18, 2014.
U.S. Office Action for U.S. Appl. No. 13/776,126, dated May 23, 2013.
U.S. Office Action for U.S. Appl. No. 13/777,627, dated Jan. 30, 2015.
U.S. Office Action for U.S. Appl. No. 13/777,627, dated Jul. 1, 2014.
U.S. Office Action for U.S. Appl. No. 14/013,286, dated Aug. 6, 2014.
U.S. Office Action, dated Feb. 23, 2015, issued in U.S. Appl. No. 13/752,711.

\* cited by examiner

COMPOSITE AND METHOD FOR PRODUCING THE SAME, RUBBER COMPOSITION, AND PNEUMATIC TIRE

TECHNICAL FIELD

The present invention relates to a composite and a method for producing the composite, a rubber composition containing the composite, and a pneumatic tire formed from the rubber composition.

BACKGROUND ART

Fuel economy of vehicles has been conventionally improved by reducing rolling resistance of tires to suppress the heat build-up. In recent years, with the increase in demand for fuel-efficient vehicles, not only the tread occupying a larger portion of a tire but also other tire components such as sidewall have been needed to contribute to an improvement in fuel efficiency. Moreover, fuel-efficient tires for passenger cars as well as for trucks and buses are needed. Therefore, it is also important to improve abrasion resistance at the same time.

The performance in terms of low heat build-up can be improved by, for example, using a semi-reinforcing filler in a rubber composition or reducing the amount of filler in a rubber composition, but on the other hand abrasion resistance and tensile properties are then reduced. Therefore, such properties are difficult to achieve at the same time.

Moreover, silica is used for the purpose of reducing rolling resistance, but silica strongly self-aggregates and is therefore difficult to uniformly disperse by an ordinary kneading method. In particular, finely divided silica is more likely to strongly aggregate. In addition, a chemical reaction of silica with a silane coupling agent needs large amounts of energy and time. Therefore, such a reaction is difficult to sufficiently progress by an ordinary kneading method. Further, the unreacted silane coupling agent generates alcohol (e.g. ethanol), which disadvantageously creates bubbles in a formed article.

Meanwhile, natural rubber has poor processability compared to other synthetic rubbers, and is usually used after being subjected to mastication. Therefore, natural rubber generally has poor productivity. Further, the mastication causes molecular chain scission in natural rubber, which poses the problem that natural rubber loses its original properties as a high-molecular-weight polymer (e.g., fuel efficiency, abrasion resistance, tensile properties).

Patent Literature 1 discloses a composite prepared by mixing a natural rubber latex with finely divided silica formed from a water glass, as a rubber masterbatch having improved mechanical strength. However, sufficient reaction of a silane coupling agent is not sufficiently examined in this document. Therefore, there is room for improvement in achieving fuel efficiency, abrasion resistance, and tensile properties at the same time.

CITATION LIST

Patent Literature

Patent Literature 1: JP 2009-51955 A

SUMMARY OF INVENTION

Technical Problem

The present invention aims to solve the above problems and provide a composite including a rubber component in which surface-treated silica with a small particle size is uniformly dispersed, and a method for producing the composite.

The present invention also aims to provide a rubber composition including the composite, the rubber composition capable of achieving both fuel efficiency and abrasion resistance while having excellent processability, as well as providing a pneumatic tire including the rubber composition.

Solution to Problem

The present invention relates to a composite, formed from a compound latex prepared by mixing a natural rubber latex with a dispersion of surface-treated silica formed from a water glass, the surface-treated silica having an average particle size of not larger than 100 nm and having a chemically-treated surface.

The surface is preferably chemically treated with a compound containing a functional group that is reactive with a double bond in a rubber of the natural rubber latex. The functional group preferably contains sulfur. Further, the functional group containing sulfur is preferably a mercapto group.

The rubber preferably has a phosphorus content of not more than 200 ppm. The rubber preferably has a nitrogen content of not more than 0.3 mass %. The natural rubber latex is preferably prepared by saponification of a natural rubber latex.

The surface-treated silica in the dispersion of surface-treated silica preferably has an average particle size of not larger than 20 nm.

The present invention also relates to a method for producing the composite, the method comprising the steps of: (I) preparing a dispersion of finely divided silica from a water glass; (II) chemically treating a surface of the finely divided silica in the dispersion to prepare a dispersion of surface-treated silica; (III) mixing the dispersion of surface-treated silica with a natural rubber latex to prepare a compound latex; and (IV) coagulating the compound latex.

Here, preferably, the dispersion of finely divided silica is prepared by adjusting an aqueous solution of the water glass to a pH of 9 to 11 with an ion exchange resin, and the silica in the dispersion has an average particle size of not larger than 20 nm.

The present invention also relates to a rubber composition, comprising the composite. The present invention also relates to a pneumatic tire, formed from the rubber composition.

Advantageous Effects of Invention

The composite of the present invention is obtained from a compound latex prepared by mixing a natural rubber latex with a dispersion of surface-treated silica formed from a water glass, the surface-treated silica having an average particle size of not larger than 100 nm and having a chemically-treated surface. Therefore, surface-treated silica with a small particle size is uniformly dispersed in the composite, and a coupling reaction is also allowed to sufficiently proceed, whereby silica and rubber can be tightly bound to each other via a silane coupling agent. Thus, a composite that is excellent in processability, low heat build-up, and mechanical strength can be obtained. In addition, the use of the composite in a tire component such as a tread provides a pneumatic tire in which both fuel efficiency and abrasion resistance are achieved.

DESCRIPTION OF EMBODIMENTS

<Composite>

The composite of the present invention is formed from a compound latex prepared by mixing a natural rubber latex with a dispersion (surface-treated silica dispersion) formed from a water glass, in which surface-treated silica having an average particle size of not larger than 100 nm and having a chemically-treated surface is dispersed.

For example, the composite of the present invention may suitably be prepared by a method including the steps of: (I) preparing a dispersion of finely divided silica from a water glass; (II) chemically treating a surface of the finely divided silica in the dispersion to prepare a dispersion of surface-treated silica; (III) mixing the dispersion of surface-treated silica with a natural rubber latex to prepare a compound latex; and (IV) coagulating the compound latex.
(Step (I))

In Step (I), a dispersion of finely divided silica is prepared from a water glass.

Specifically, in the present invention, a water glass, a starting material of silica, is not used as it is, but is grown into spherical fine particles before use. In this growth, it is preferable to prolong the aging time so that each spherical fine particle has a perfectly spherical shape. Silica particles each having a perfectly spherical shape weakly aggregate and are likely to be dispersed because the contact area among the silica particles is reduced to the minimum.

The dispersion of finely divided silica is preferably prepared by adjusting an aqueous water glass solution to a pH of 9 to 11.

A water glass generally has a composition represented by the following formula:

$Na_2O \cdot nSiO_2 \cdot mH_2O$.

The factor n is a molecular ratio of $SiO_2/Na_2O$, generally referred to as a molar ratio, defined in JIS K 1408-1966. The factor n is not particularly limited, and is preferably 2.1 to 3.3 and more preferably 3.1 to 3.3. In cases where the factor n is 3.1 to 3.3, the amount of the silica component (calculated as $SiO_2$) in a water glass is increased and therefore the silica and rubber are more efficiently combined into a composite.

The water glass having a factor n of 3.1 to 3.3 is generally commercially available as water glass #3. The water glass usable in the present invention is not particularly limited to such water glasses, and water glasses #1 to #3 in accordance with JIS K1408 and various grades of water glasses may be used.

The dispersion of finely divided silica having an average particle size of not larger than 100 nm can be prepared by preparing an aqueous water glass solution and adjusting the solution to a pH of 9 to 11. If the pH is less than 9, the dispersion is likely to turn into a gel. If the pH is more than 11, the finely divided silica tends to be dissolved. The pH is more preferably adjusted to 9.5 to 10.5. The method for adjusting the pH to 9 to 11 is not particularly limited, and may be a conventional method such as adding acid or alkali or using an ion exchange resin. In particular, use of an ion exchange resin is preferred for providing a dispersion in which finely divided silica is more dispersed.

The method for adjusting the pH with an ion exchange resin may, for example, be to bring an aqueous water glass solution into contact with a cation exchange resin. Specifically, for example, an aqueous water glass solution diluted to a predetermined concentration is brought into contact with a cation exchange resin for dealkalization, and is optionally brought into contact with an OH-type strong basic anion exchange resin for deanionization. The aqueous water glass solution may be brought into contact with the cation exchange resin by a batch method including directly adding the cation exchange resin into the aqueous water glass solution and stirring the solution to bring the solution into contact with the resin, or by a method including passing the aqueous water glass solution through a column packed with the cation exchange resin. The cation exchange resin to be used may, for example, be an H-type strong acidic cation exchange resin or a weakly acidic cation exchange resin, and examples of commercially available products include Amberlite IR120B, IR124, 200CT, IRC76, and FPC3500 (ORGANO CORPORATION). The above methods can remove sodium ions and the like in a water glass and therefore enable formation of finer silica particles.

The temperature of the aqueous water glass solution is desirably controlled at 10 to 90° C. during the pH adjustment. If the temperature is lower than 10° C., the formation rate of finely divided silica may be slow. If the temperature is higher than 90° C., water of the aqueous solution may evaporate, making the concentration of water glass in the aqueous solution more unstable. The temperature of the aqueous solution may be appropriately adjusted, and is preferably in the range of 15 to 40° C. or of 60 to 80° C., for example.

The reaction time is preferably in the range of 1 to 72 hours. If the reaction time is less than 1 hour, finely divided silica is likely to be insufficiently formed. Also, if the reaction time is more than 72 hours, the reaction is likely to be already completed so that no further change will occur. In the case of the reaction at room temperature, the reaction may suitably be carried out for 6 to 24 hours with stirring. In order to make the silica particles as perfectly spherical shape as possible, the silica particles are preferably aged at high temperatures and for a long time, suitably at 60 to 80° C. and for not less than 24 hours.

The concentration of the silica component ($SiO_2$) in the aqueous water glass solution is preferably in the range of 1 to 30 mass %. If the concentration is less than 1 mass %, a large amount of the aqueous water glass solution needs to be used for the formation of a composite with rubber latex. If the concentration is more than 30 mass %, silica is likely to aggregate. The concentration of the silica component is more preferably in the range of 1.5 to 20 mass %, still more preferably 2 to 8 mass %. However, when a water glass subjected to demineralization is used, the silica is less likely to aggregate and thus the upper limit of the concentration is not particularly limited.

The silica contained in the finely divided silica dispersion has an average particle size of not larger than 100 nm, preferably not larger than 30 nm, more preferably not larger than 20 nm, still more preferably not larger than 15 nm, and particularly preferably not larger than 10 nm. The average particle size may be appropriately controlled by adjusting the conditions such as the pH of the aqueous solution, the concentration of the silica component, the reaction temperature, and the reaction time.

As used herein, the average particle size is determined by transmission electron microscope (TEM) observation. Specifically, a picture of fine particles is taken with a transmission electron microscope, and the particle sizes of 100 fine particles are measured and averaged to determine the average particle size. Here, the particle size of a fine particle having a spherical shape is measured as a diameter of the sphere, the particle size of a fine particle having a needle shape or a rod shape is measured as a minor diameter of the particle, and the particle size of a fine particle having an atypical shape is measured as an average particle size of particle sizes passing through the center of the fine particle.
(Step (II))

In Step (II), the surfaces of the silica particles in the finely divided silica dispersion obtained in Step (I) are chemically treated to prepare a surface-treated silica dispersion.

The chemical treatment (surface treatment) may be performed by any method as long as a compound for treatment is brought into contact with the finely divided silica dispersion. Further, after the treatment, hydrophobing treatment is preferably performed using a hydrophobing agent (agent having a hydrophobing effect) by the same method. Specifically, for example, the pH of the finely divided silica dispersion is adjusted to 2 to 6, a compound for treatment and then optionally a hydrophobing agent are added, the pH of the mixture is adjusted to not more than 1.5, and the resulting mixture is allowed to stand still for a certain period of time at a predetermined temperature.

In the treatments, the pH adjustment to 2 to 6 and pH adjustment to not more than 1.5 may be performed by, for example, adding an acid such as formic acid, sulfuric acid, or hydrochloric acid. The temperature in each of the chemical treatment and hydrophobing treatment may be appropriately set within a range such that the reaction between the silica and the compound or the hydrophobing treatment sufficiently proceeds, and the temperature is usually preferably 30 to 90° C. The treatment time in each treatment is preferably 5 minutes to 24 hours. The pH of the surface-treated silica dispersion obtained by the method mentioned above is usually adjusted to 5 to 8. The pH may be adjusted by a conventional method such as addition of alkali.

The chemical treatment is preferably performed using a compound for chemical treatment containing a functional group that is reactive with a double bond in the rubber because favorable binding between silica and rubber is then obtained. Examples of the functional group include a sulfide group, a mercapto group (—SH), a vinyl group, an amino group, a glycidoxy group, a nitro group, and a chloro group. In particular, a functional group containing sulfur, such as a sulfide group (monosulfide group, polysulfide group) and a mercapto group are preferred because tight binding is then formed. A sulfide group and a mercapto group are more preferred.

Suitable specific examples of the compound for chemical treatment to be used include compounds represented by the following formulas (1) to (3).

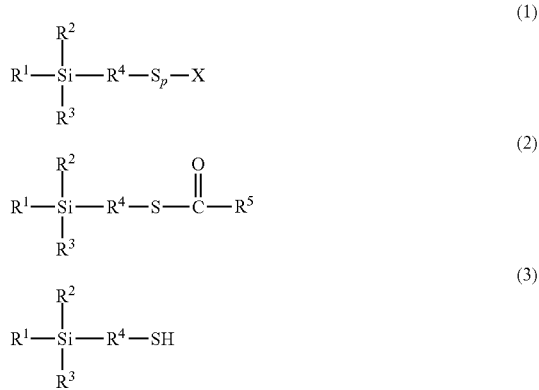

In the formulas, $R^1$, $R^2$, and $R^3$ are the same as or different from one another, and each represent a C1-C12 alkyl group or a C1-C12 alkoxy group; $R^4$ represents a C1-C6 alkylene group; $R^5$ represents a C1-C30 alkyl group; an average value of p is 1 to 5; X represents $R^1R^2R^3$—Si—$R^4$—, a C1-C30 alkyl group, a C2-C30 alkenyl group, —CS—$NR^6R^7$ (where $R^6$ and $R^7$ are the same as or different from one another, and each represent a C1-C12 alkyl group), a benzothiazolyl group, an acryloxy group ($CH_2$=CH—CO—O—), or a methacryloxy group ($CH_2$=C($CH_3$)—CO—O—).

Examples of the C1-C12 alkyl group for $R^1$, $R^2$, or $R^3$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group.

Examples of the C1-C12 alkoxy group for $R^1$, $R^2$, or $R^3$ include a methoxy group, an ethoxy group, an n-propoxy group, an isopropoxy group, an n-butoxy group, and a t-butoxy group. The alkoxy group is preferably a C1-C8 alkoxy group, and more preferably a C1-C3 alkoxy group, because of their high reactivity (hydrolyzability).

Examples of the C1-C6 alkylene group for $R^4$ include an ethylene group, a propylene group, a butylene group, a pentylene group, and a hexylene group. The alkylene group is preferably a C2-C4 alkylene group because it leads to lower energy dissipation between rubber and silica.

Examples of the C1-C30 alkyl group for $R^5$ include the same groups as mentioned for the alkyl group for $R^1$, $R^2$, or $R^3$.

The $R^1R^2R^3$—Si—$R^4$— for X may be the same as or different from the $R^1R^2R^3$—Si—$R^4$— in formula (1). Examples of the C1-C30 alkyl group for X include the same groups as mentioned for the alkyl group for $R^1$, $R^2$, or $R^3$. Examples of the C2-C30 alkenyl group for X include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. Examples of the C1-C12 alkyl group for $R^6$ or $R^7$ in the —CS—$NR^6R^7$ for X include the same groups as mentioned for the alkyl group for $R^1$, $R^2$, or $R^3$.

Among the compounds represented by formulas (1) to (3), the compounds represented by formulas (1) and (3) are preferred because they contribute to better achievement of the effects of the present invention.

Examples of the compounds represented by formula (1) include bis(3-triethoxysilylpropyl)tetrasulfide, bis(3-trimethoxysilylpropyl)tetrasulfide, bis(3-triethoxysilylpropyl)trisulfide, bis(3-triethoxysilylpropyl)disulfide, 3-triethoxysilylpropyl-N,N-dimethylthiocarbamoyl tetrasulfide, 2-triethoxysilylethyl-N,N-dimethylthiocarbamoyl tetrasulfide, 3-triethoxysilylpropylbenzothiazole tetrasulfide, and 3-triethoxysilylpropylmethacrylate monosulfide.

Examples of the compounds represented by formula (3) include 3-mercaptopropyltrimethoxysilane, 3-mercaptopropyltriethoxysilane, 2-mercaptoethyltrimethoxysilane, and 2-mercaptoethyltriethoxysilane.

The amount of the compound for chemical treatment used in the chemical treatment, expressed per 100 parts by mass (calculated as $SiO_2$) of the silica in the finely divided silica dispersion, is preferably not less than 2 parts by mass, and more preferably not less than 4 parts by mass. If the amount is less than 2 parts by mass, sufficient low heat build-up and mechanical strength may not be achieved. The amount is preferably not more than 20 parts by mass, and more preferably not more than 15 parts by mass. If the amount is more than 20 parts by mass, some compounds may remain unreacted, resulting in deterioration of processability.

As described above, in the present invention, hydrophobing treatment is optionally performed after the chemical treatment. In this case, the affinity for rubber increases, which leads to tight binding therewith.

The hydrophobing agent to be used is not particularly limited as long as the agent provides a hydrophobing effect, and examples thereof include diethyldichlorosilane, allylmethyldichlorosilane, methylphenyldichlorosilane, phenylethyldiethoxysilane, trimethylbutoxysilane, diphenyltetramethyldisiloxane, trivinyltrimethylcyclotrisiloxane, hexaethyldisiloxane, pentylmethyldichlorosilane, divinyldipropoxysilane, vinyldimethylchlorosilane, vinyldimethylmethoxysilane, trimethylchlorosilane, trimethylmethoxysilane, trimethylethoxysilane, methyltrichlorosilane, methyltrimethoxysilane, hexamethyldisiloxane, dimethylchlorosilane, and dimethyldichlorosilane.

In particular, the hydrophobing agent may suitably be a compound represented by the following formula (4):

$$R^8_m SiY_{4-m} \quad (4)$$

wherein $R^8$s are the same or different and each represent a C1-C12 alkyl group (in which at least one hydrogen atom may be replaced by a hydroxyl group, an amino group, an amide group, or a carboxy group); Ys are the same or different and each represent a halogen, an amino group, or a C1-C12 alkoxy group; and m represents an integer of 1 to 3.

Examples of the C1-C12 alkyl group for $R^8$ include the same groups as mentioned for the alkyl group for $R^1$, $R^2$, or $R^3$. The alkyl group is preferably a C1-C4 alkyl group, and more preferably a C1-C2 alkyl group.

Examples of the halogen for Y include chlorine, bromine, and fluorine. Examples of the amino group for Y include an N,N-dimethylamino group, an N,N-diethylamino group, an N,N-dipropylamino group, an N,N-dibutylamino group, and a morpholino group. Examples of the C1-C12 alkoxy group for Y include the same groups as mentioned for the alkoxy group for $R^1$, $R^2$, or $R^3$. The alkoxy group is preferably a C1-C8 alkoxy group, and more preferably a C1-C3 alkoxy group.

The subscript m is more preferably 1 to 2 because such a hydrophobing agent favorably binds to silica.

In cases where the hydrophobing treatment is performed, the ratio of the compound for chemical treatment to the hydrophobing agent is preferably 0.1:1 to 10:1, and more preferably 0.2:1 to 5:1. If the ratio of the compound for chemical treatment is small, the affinity for and the binding force with rubber are reduced to cause deterioration of fuel efficiency and abrasion resistance. If the ratio of the compound for chemical treatment is large, the effect of the hydrophobing agent added is reduced.

In order to allow the surface-treated silica in the dispersion obtained as above to sufficiently bind to rubber, the amount of an SH group on the surface-treated silica is preferably not less than 0.15 parts by mass, and more preferably not less than 0.3 parts by mass, per 100 parts by mass of the silica.

The surface-treated silica in the dispersion has an average particle size of not larger than 100 nm, preferably not larger than 30 nm, more preferably not larger than 20 nm, still more preferably not larger than 15 nm, and particularly preferably not larger than 10 nm. The average particle size may be appropriately controlled by adjusting the conditions such as the temperatures, treatment times, and pHs of the chemical treatment and hydrophobing treatment.

The nitrogen adsorption specific surface area ($N_2SA$) of the surface-treated silica in the dispersion is not particularly limited, and is preferably not less than 30 m$^2$/g, more preferably not less than 50 m$^2$/g, and still more preferably not less than 100 m$^2$/g. If the $N_2SA$ is less than 30 m$^2$/g, the reinforcing effect tends to be reduced. The $N_2SA$ is preferably not more than 500 m$^2$/g, more preferably not more than 400 m$^2$/g, and still more preferably not more than 250 m$^2$/g. If the $N_2SA$ is more than 500 m$^2$/g, the dispersibility tends to be poor and the heat build-up tends to be increased.

The $N_2SA$ of silica is determined by the BET method in accordance with ASTM D3037-81.

(Step (III))

In Step (III), the surface-treated silica dispersion obtained in Step (II) and a natural rubber latex are mixed with each other to prepare a compound latex.

A natural rubber latex is sap taken from trees of natural rubber such as hevea trees, and contains components including water, proteins, lipids, and inorganic salts as well as a rubber fraction. A gel fraction in the rubber is thought to be derived from a complex of various impurities in the rubber. In the present invention, the natural rubber latex to be used may be, for example, a raw latex (field latex) taken from hevea trees by tapping or a latex concentrated by centrifugation or creaming (e.g. purified latex, high-ammonia latex prepared by adding ammonia by a conventional method, a LATZ latex stabilized with zinc oxide, TMTD, and ammonia).

The natural rubber latex used in the present invention is preferably a modified natural rubber latex prepared by saponification of a natural rubber latex mentioned above. Owing to the saponification, phosphorus compounds are separated from the rubber, and subsequently removed by washing in Step (V) described later, whereby the phosphorus content in the natural rubber in the composite to be prepared can be reduced. Further, the saponification decomposes proteins in the natural rubber, whereby the nitrogen content in the natural rubber can be reduced.

The saponification may be suitably carried out, for example, by the methods disclosed in JP 2010-138359 A and JP 2010-174169 A (which are incorporated by reference in their entirety). Specifically, the saponification may be carried out by adding an alkali and optionally a surfactant to a natural rubber latex and allowing the mixture to stand still for a certain period of time at a predetermined temperature. In the saponification, stirring or the like may be optionally performed.

Preferred examples of the alkali used in the saponification include sodium hydroxide and potassium hydroxide. The surfactant is not particularly limited, and examples thereof include conventional nonionic, anionic, and amphoteric surfactants such as polyoxyethylene alkyl ether sulfates. Polyoxyethylene alkyl ether sulfates are suitable from the viewpoint of favorable saponification of the rubber without coagulation. In the saponification, the amounts of the alkali and surfactant, and the temperature and treatment time of the saponification may be set as appropriate.

In Step (III), the natural rubber latex and the surface-treated silica dispersion are mixed with each other by a conventional method, and the mixture is then sufficiently stirred to provide a homogeneous solution. Thus, a compound latex (mixed solution) is prepared. The natural rubber latex to be used preferably has a rubber solids content of 10 to 70 mass %.

In the mixing step, the surface-treated silica dispersion is preferably mixed with the natural rubber latex so that the amount of the silica per 100 parts by mass (of solids) of the natural rubber is 5 to 150 parts by mass (calculated as $SiO_2$). If the amount of the silica is less than 5 parts by mass, the amount of silica may be too small for use as a masterbatch. If the amount is more than 150 parts by mass, the silica is less likely to be uniformly dispersed in the rubber latex, and therefore the silica is less likely to be uniformly dispersed in a rubber composition prepared from a coagulum of the compound latex. The amount of the silica is more preferably 5 to 120 parts by mass, and still more preferably 10 to 100 parts by mass.

(Step (IV))

In Step (IV), the compound latex obtained in Step (III) is coagulated (aggregated) to form a composite in which silica is uniformly dispersed in the rubber. The compound latex may be coagulated by, for example, acid coagulation, salt coagulation, methanol coagulation, or coagulation using a polymer flocculant. Acid coagulation is preferred because coagulation can then be effected while silica is uniformly dispersed. The acid to be used for the coagulation may be, for example, sulfuric acid, hydrochloric acid, formic acid or acetic acid.

The coagulation of the compound latex with acid is preferably performed by adding acid to adjust the compound latex to a pH of 5 to 9 (preferably 6 to 8, more preferably 6.5 to 7.5), whereby the solids of the latex are coagulated. In doing so, a composite including finely dispersed silica can be suitably prepared.

(Step (V))

After the Step (IV), the resulting coagulum (aggregated matter containing a rubber aggregate and silica) is preferably washed (Step (V)). In particular, in cases where a modified natural rubber latex is used in Step (III), such a washing step controls (reduces) the phosphorus content in the rubber (natural rubber) to not more than 200 ppm. That is, the washing step after the saponification reduces the amount of phosphorus in the natural rubber in the coagulum to not more than 200 ppm.

In the washing method of Step (V), for example, the rubber component may be diluted with water and then the mixture may be centrifuged or left at rest to allow the rubber component to float to discharge only the water phase. The washing step may optionally be repeated until the phosphorus content is reduced to not more than 200 ppm.

After the washing, the rubber is typically dried by a conventional method (such as by using an oven). The dried rubber is kneaded with a two-roll mill, Banbury mixer, or the like to provide a composite containing natural rubber and silica. The composite may contain other ingredients as long as they do not inhibit the effects of the present invention.

The natural rubber in the composite preferably has a phosphorus content of not more than 200 ppm. The composite having a phosphorus content in such a range is excellent in processability and can be used in the preparation of a rubber composition without being subjected to mastication in advance. This maintains the original properties of natural rubber as a high-molecular-weight polymer. If the phosphorus content is more than 200 ppm, then sufficient fuel efficiency tends not to be achieved. The phosphorus content is preferably not more than 150 ppm, and more preferably not more than 120 ppm. The phosphorus content can be measured by a conventional method such as ICP optical emission spectrometry. The phosphorus is derived from phospholipids (phosphorus compounds).

The natural rubber in the composite preferably has a nitrogen content of not more than 0.3 mass %, more preferably not more than 0.15 mass %. If the nitrogen content is more than 0.3 mass %, the Mooney viscosity tends to increase during storage and thereby deteriorate processability, and the fuel efficiency also tends to be insufficient. The nitrogen is derived from proteins. The nitrogen content can be measured by a conventional method such as the Kjeldahl method.

The natural rubber in the composite preferably has a gel content, determined as a toluene-insoluble matter, of not more than 20 mass %, more preferably not more than 10 mass %. If the gel content is more than 20 mass %, the Mooney viscosity tends to increase and thereby deteriorate processability. The gel content refers to a value determined as a matter insoluble in toluene, which is a non-polar solvent. Hereinafter, this content may be referred to simply as "gel content" or "gel fraction". The amount of the gel fraction is determined by the following method. First, a natural rubber sample is immersed in dehydrated toluene and then allowed to stand for one week in a dark place protected from light. Next, the toluene solution is centrifuged for 30 minutes at $1.3 \times 10^5$ rpm so that a toluene-insoluble gel fraction and a toluene-soluble fraction are separated from each other. The toluene-insoluble gel fraction is mixed with methanol for solidification, and then dried. Finally, the gel content is determined from the ratio of the mass of the dried gel fraction to the mass of the original sample.

<Rubber Composition>

The rubber composition of the present invention contains the composite. This provides excellent fuel efficiency, abrasion resistance, and processability. The composite can be used as a masterbatch. In the composite, silica is uniformly dispersed in rubber. Therefore, the silica can also be uniformly dispersed in the rubber composition of the present invention which contains other rubber(s) and rubber compounding agent(s). As a result, the above properties are achieved at high levels.

The rubber component of the rubber composition of the present invention may include rubber(s) other than the natural rubber. Examples of other rubbers include natural rubber (NR), isoprene rubber (IR), butadiene rubber (BR), styrene butadiene rubber (SBR), styrene-isoprene-butadiene rubber (SIBR), ethylene-propylene-diene rubber (EPDM), chloroprene rubber (CR), and acrylonitrile butadiene rubber (NBR).

With regard to the rubber component (including the natural rubber in the composite and other rubbers) in the rubber composition, the amount (of solids) of the natural rubber in the composite based on 100 mass % of the rubber component is preferably not less than 60 mass %, more preferably not less than 80 mass %, and may be 100 mass %. If the amount is less than 60 mass %, then sufficient fuel efficiency, abrasion resistance, and processability may not be achieved.

The rubber composition of the present invention may contain additional silica in addition to the silica in the composite. The additional silica may be any type of silica, and may be, for example, dry silica (anhydrous silicic acid) or wet silica (hydrous silicic acid).

In the rubber composition, the total amount of silica (the total amount of the silica in the composite and additional silica) per 100 parts by mass of the rubber component is preferably not less than 5 parts by mass, and more preferably not less than 10 parts by mass. If the total amount of silica is less than 5 parts by mass, sufficient reinforcement may not be achieved. The total amount is preferably not more than 150 parts by mass, and more preferably not more than 100 parts by mass. If the total amount is more than 150 parts by mass, the fuel efficiency may not be sufficiently achieved.

In addition to the above ingredients, the rubber composition of the present invention may optionally contain various ingredients generally used in the tire industry, such as carbon black, silane coupling agents, zinc oxide, stearic acid, antioxidants, sulfur, and vulcanization accelerators.

The rubber composition of the present invention can be prepared by a known method. For example, the ingredients are kneaded using a rubber kneader such as an open roll mill, a Banbury mixer, or an internal mixer, and the kneaded mixture is then vulcanized.

The rubber composition can be used for various tire components and particularly suitably used for treads and sidewalls.

<Pneumatic Tire>

The pneumatic tire of the present invention can be formed from the rubber composition by an ordinary method. Specifically, the unvulcanized rubber composition appropriately containing additives is extruded and processed into the shape of a tire component, and then molded in a tire building machine in an ordinary manner to prepare an unvulcanized tire. This unvulcanized tire is heat-pressurized in a vulcanizer to produce a pneumatic tire.

The pneumatic tire of the present invention can be suitably used, for example, for passenger cars, trucks and buses, and low-emission cars (eco cars) contributing to global environmental protection.

EXAMPLES

The present invention is more specifically described with reference to examples, and the present invention is not limited to these examples.

Chemicals used in the examples are listed below.
Natural rubber latex: Field latex available from THAITEX
Surfactant: Emal-E produced by Kao Corporation
NaOH: NaOH produced by Wako Pure Chemical Industries, Ltd.
Water glass: Water glass #3 ($Na_2O.nSiO_2.mH_2O$, n=3.2, amount of silica component (calculated as $SiO_2$): 28 mass %) produced by Fuji Kagaku CORP.
3-Mercaptopropyltrimethoxysilane: KBM-803 produced by Shin-Etsu Chemical Co., Ltd.
Dimethyldichlorosilane: KA-22 produced by Shin-Etsu Chemical Co., Ltd.
Natural rubber: TSR
Silica (1): Ultrasil VN3 ($N_2SA$: 175 $m^2/g$) produced by EVONIK-DEGUSSA
Silica (2): Premium 200MP ($N_2SA$: 200 $m^2/g$) produced by Rhodia
Silane coupling agent: Si69 (bis(3-triethoxysilylpropyl)tetrasulfide) produced by EVONIK-DEGUSSA
Oil: Process X-140 produced by Japan Energy Corporation
Zinc oxide: Zinc oxide #1 produced by Mitsui Mining & Smelting Co., Ltd.
Stearic acid: TSUBAKI produced by NOF Corporation
Antioxidant: NOCRAC 6C (N-(1,3-dimethylbutyl)-N'-phenyl-p-phenylenediamine) produced by Ouchi Shinko Chemical Industrial Co., Ltd.
Sulfur: Sulfur powder produced by Tsurumi Chemical Industry Co., Ltd.
Vulcanization accelerator NS: NOCCELER NS (N-tert-butyl-2-benzothiazolylsulfenamide) produced by Ouchi Shinko Chemical Industrial Co., Ltd.
Vulcanization accelerator D: NOCCELER D (N,N'-diphenylguanidine) produced by Ouchi Shinko Chemical Industrial Co., Ltd.

(Preparation of Saponified Natural Rubber Latex Using Alkali)

A natural rubber latex was adjusted to have a solids concentration (DRC) of 30% (w/v). Then, Emal-E (10 g) and NaOH (20 g) were added to the natural rubber latex (1000 g), and a saponification reaction was carried out for 48 hours at room temperature to prepare a saponified natural rubber latex.
(Production of Saponified Natural Rubber (Solid Rubber))

Water was added to the resulting saponified natural rubber latex to adjust the solids concentration (DRC) to 15% (w/v), and thereto was added formic acid with slow stirring to adjust the pH to 4.0 to 4.5, whereby the latex was aggregated. The rubber aggregate was crushed and washed with 1000 ml of water repeatedly, and the resulting rubber was dried at 110° C. for 2 hours. Thus, a saponified natural rubber (solid rubber) was prepared.

(Preparation of Finely Divided Silica Dispersions (1) and (2))

An aqueous water glass solution having an amount (concentration) of the silica component of 2 mass % was prepared from a water glass, adjusted to a pH of 10, and then stirred at 25° C. for 10 to 24 hours. In this manner, finely divided silica dispersions (1) and (2) were prepared. The pH was adjusted with sulfuric acid.

(Preparation of Finely Divided Silica Dispersion (3))

An aqueous water glass solution having an amount (concentration) of the silica component of 2 mass % was prepared from a water glass, adjusted to a pH of 10, and then stirred at 80° C. for 24 hours. Thus, a finely divided silica dispersion (3) was prepared. The pH was adjusted using an H-type strong acidic cation exchange resin (IR120B produced by ORGANO CORP.).

The average particle sizes of the silicas in the finely divided silica dispersions (1) to (3) were 20 nm, 22 nm, and 15 nm, respectively.

(Surface Treatment)

The pH of each of the finely divided silica dispersions (1) to (3) was adjusted to 3 to 4 using sulfuric acid. 3-Mercaptopropyltrimethoxysilane was added dropwise to each dispersion with stirring and dimethyldichlorosilane was subsequently added dropwise thereto, according to Table 1. The pH of the resulting dispersion was adjusted to 0.5 using hydrochloric acid and the dispersion was then maintained at 60° C. for 30 minutes. After that, 50 mass % sodium hydroxide was added to the dispersion with cooling to adjust the pH to 6 to 7. In this manner, surface-treated silica dispersions (1) to (3) were prepared.

Table 1 shows the average particle sizes of the surface-treated silicas in the obtained surface-treated silica dispersions (1) to (3).

TABLE 1

| | | Surface-treated silica dispersion (1) | Surface-treated silica dispersion (2) | Surface-treated silica dispersion (3) |
|---|---|---|---|---|
| Amount | 3-Mercaptopropyltrimethoxysilane | 4 | 6 | 6 |
| | Dimethyldichlorosilane | 1 | 1 | 1 |
| Measurement result | Average particle size (nm) | 20 nm | 22 nm | 15 nm |

Amount (part(s) by mass): per 100 parts by mass of silica (calculated as $SiO_2$)

(Preparation and Coagulation of Compound Latex, Preparation of Composite)

The saponified natural rubber latex or natural rubber latex, and one of the surface-treated silica dispersions (1) to (3) were mixed according to the amounts shown in Table 2 to prepare a compound latex. The compound latex was sufficiently stirred until it was uniformly mixed, and the pH thereof was then adjusted to 7 with sulfuric acid, whereby the latex was coagulated. The resulting solids were filtrated to recover the rubber component, which was then washed with 1000 ml of water repeatedly. The resulting rubber component was dried at 110° C. for 2 hours.

In this manner, composites (A) to (G) were prepared.

TABLE 2

|  | Rubber latex | Surface-treated silica dispersion | Amount (per 100 g of rubber component) |
| --- | --- | --- | --- |
| Composite (A) | Saponified natural rubber latex | Dispersion (1) | Silica 50 g |
| Composite (B) | Saponified natural rubber latex | Dispersion (1) | Silica 75 g |
| Composite (C) | Saponified natural rubber latex | Dispersion (2) | Silica 50 g |
| Composite (D) | Saponified natural rubber latex | Dispersion (3) | Silica 40 g |
| Composite (E) | Natural rubber latex | Dispersion (1) | Silica 50 g |
| Composite (F) | Natural rubber latex | Dispersion (2) | Silica 50 g |
| Composite (G) | Natural rubber latex | Dispersion (3) | Silica 40 g |

The modified natural rubbers in the composites (A) to (D), the natural rubbers in the composites (E) to (G), the saponified natural rubber (solid rubber), and TSR were measured for nitrogen content, phosphorus content, and gel content by the following methods. Table 3 shows the results.

(Measurement of Nitrogen Content)

The nitrogen content was measured using CHN CORDER MT-5 (produced by Yanaco Analytical Instruments). In the measurement, first, a calibration curve for the nitrogen content was prepared with antipyrin taken as a reference material. Next, about 10 mg of a sample was weighed and subjected to the measurement three times, and the average of the three measurements was determined as a nitrogen content.

(Measurement of Phosphorus Content)

The phosphorus content of a sample was determined using an ICP optical emission spectrometer (ICPS-8100 produced by Shimadzu Corp.).

(Measurement of Gel Content)

First, 70.00 mg of a sample cut in a size of 1 mm×1 mm was weighed, and 35 mL of toluene was added thereto. The mixture was allowed to stand still for one week in a cool and dark place. Next, the mixture was centrifuged so that a toluene-insoluble gel fraction was precipitated, and then a toluene-soluble fraction (supernatant) was removed. Then, the gel fraction alone was solidified with methanol and dried. The mass of the dried gel fraction was measured. The gel content (mass %) was determined by the following formula.

(Gel content (mass %))=(Mass (mg) of dried gel fraction)/(Mass (mg) of original sample)×100

TABLE 3

|  | Nitrogen content (mass %) | Phosphorus content (ppm) | Gel content (mass %) |
| --- | --- | --- | --- |
| Saponified natural rubber | 0.15 | 90 | 5.2 |
| TSR | 0.35 | 579 | 20.9 |
| Composite (A) | 0.15 | 82 | 4.6 |
| Composite (B) | 0.14 | 84 | 4.5 |
| Composite (C) | 0.15 | 88 | 4.3 |
| Composite (D) | 0.15 | 86 | 5.0 |
| Composite (E) | 0.33 | 463 | 13.2 |
| Composite (F) | 0.32 | 472 | 12.8 |
| Composite (G) | 0.33 | 449 | 13.9 |

Table 3 shows that the saponified natural rubbers included in the respective composites (A) to (D) had a reduced phosphorus content, a reduced nitrogen content, and a reduced gel content as compared to the composites (E) to (G) and TSR.

(Preparation of Rubber Specimens)

In accordance with each of the formulations shown in Table 4, the chemicals other than the sulfur and vulcanization accelerators were kneaded using a 1.7-L Banbury mixer to give a kneaded mixture. Next, the sulfur and vulcanization accelerators were added to the kneaded mixture and they were kneaded using a roll mill to prepare an unvulcanized rubber composition.

The unvulcanized rubber composition was press-vulcanized at 150° C. for 30 minutes to provide a vulcanizate.

In Comparative Examples 1, 2, and 5, in which TSR was used, and Examples 4 to 6, in which a natural rubber latex was used, mastication was preliminarily performed.

The thus obtained unvulcanized rubber compositions and vulcanizates were evaluated in the following ways. Table 4 shows the results.

<Mooney Viscosity>

The Mooney viscosity of each unvulcanized rubber composition was measured at 130° C. by a method in accordance with JIS K6300. The measured value of the Mooney viscosity ($ML_{1+4}$) is expressed as an index (Mooney viscosity index) relative to that of Comparative Example 1 (=100) in accordance with the following formula. A larger index value indicates a lower Mooney viscosity and better processability.

(Mooney viscosity index)=($ML_{1+4}$ of Comparative Example 1)/($ML_{1+4}$ of each formulation)×100

(Rolling Resistance)

The loss tangent (tan δ) of each formulation (vulcanizate) was measured using a viscoelasticity spectrometer VES (produced by Iwamoto Seisakusho Co., Ltd.) at a temperature of 50° C., an initial strain of 10%, a dynamic strain of 2%, and a frequency of 10 Hz. The measured value of the loss tangent tan δ is expressed as an index (rolling resistance index) relative to that of Comparative Example 1 (=100) in accordance with the following formula. A larger index value indicates better performance in terms of rolling resistance (fuel efficiency).

(Rolling resistance index)=(tan δ of Comparative Example 1)/(tan δ of each formulation)×100

(Abrasion Test)

The Lambourn abrasion loss was determined using a Lambourn abrasion tester at a temperature of 20° C. and a slip ratio of 20% for a measurement time of 2 minutes. Then, the volumetric loss was calculated from the measured value of the Lambourn abrasion loss. The volumetric loss of each formulation (vulcanizate) is expressed as an index relative to that of Comparative Example 1 (=100) in accordance with the following formula. A larger Lambourn abrasion index indicates better abrasion resistance.

(Lambourn abrasion index)=(Volumetric loss of Comparative Example 1)/(Volumetric loss of each formulation)×100

TABLE 4

|  |  | Example 1 | Example 2 | Example 3 | Example 4 | Example 5 | Example 6 | Comparative Example 1 |
|---|---|---|---|---|---|---|---|---|
| Amount (part(s) by mass) | Composite (rubber component: 100 parts by mass) | Composite A | Composite C | Composite D | Composite E | Composite F | Composite G | — |
|  | TSR | — | — | — | — | — | — | 100 |
|  | Saponified natural rubber | — | — | — | — | — | — | — |
|  | Silica (1) | — | — | — | — | — | — | 50 |
|  | Silica (2) | — | — | — | — | — | — | — |
|  | Silane coupling agent | — | — | — | — | — | — | 4 |
|  | Oil | — | — | — | — | — | — | — |
|  | Zinc oxide | 3 | 3 | 3 | 3 | 3 | 3 | 3 |
|  | Stearic acid | 2 | 2 | 2 | 2 | 2 | 2 | 2 |
|  | Antioxidant | 2 | 2 | 2 | 2 | 2 | 2 | 2 |
|  | Sulfur | 1.5 | 1.5 | 1.5 | 1.5 | 1.5 | 1.5 | 1.5 |
|  | Vulcanization accelerator NS | 1.8 | 1.8 | 1.8 | 1.8 | 1.8 | 1.8 | 1.8 |
|  | Vulcanization accelerator D | 0.5 | 0.5 | 0.5 | 0.5 | 0.5 | 0.5 | 0.5 |
| Evaluation | Mooney viscosity index | 124 | 114 | 116 | 122 | 119 | 111 | 100 |
|  | Rolling resistance index | 127 | 129 | 123 | 115 | 119 | 110 | 100 |
|  | Lambourn abrasion index | 125 | 121 | 127 | 126 | 123 | 124 | 100 |

|  |  | Comparative Example 2 | Comparative Example 3 | Comparative Example 4 | Example 7 | Comparative Example 5 | Comparative Example 6 |
|---|---|---|---|---|---|---|---|
| Amount (part(s) by mass) | Composite (rubber component: 100 parts by mass) | — | — | — | Composite B | — | — |
|  | TSR | 100 | — | — | — | 100 | — |
|  | Saponified natural rubber | — | 100 | 100 | — | — | 100 |
|  | Silica (1) | — | 50 | — | — | 75 | 75 |
|  | Silica (2) | 50 | — | 50 | — | — | — |
|  | Silane coupling agent | 5 | 4 | 4 | — | 6 | 7.5 |
|  | Oil | — | — | — | 15 | 15 | 15 |
|  | Zinc oxide | 3 | 3 | 3 | 3 | 3 | 3 |
|  | Stearic acid | 2 | 2 | 2 | 2 | 2 | 2 |
|  | Antioxidant | 2 | 2 | 2 | 2 | 2 | 2 |
|  | Sulfur | 1.5 | 1.5 | 1.5 | 1.5 | 1.5 | 1.5 |
|  | Vulcanization accelerator NS | 1.8 | 1.8 | 1.8 | 1.8 | 1.8 | 1.8 |
|  | Vulcanization accelerator D | 0.5 | 0.5 | 0.5 | 0.5 | 0.5 | 0.5 |
| Evaluation | Mooney viscosity index | 95 | 102 | 96 | 128 | 100 | 97 |
|  | Rolling resistance index | 93 | 112 | 107 | 124 | 100 | 98 |
|  | Lambourn abrasion index | 102 | 98 | 99 | 127 | 100 | 99 |

The results in Table 4 show that, in the examples using a composite formed from a compound latex prepared by mixing a natural rubber latex and a surface-treated silica dispersion, the fuel efficiency and abrasion resistance were greatly improved because the silica dispersibility was greatly improved and silica and the rubber component were tightly bound to each other via a silane coupling agent. In particular, in Examples 1 to 3, and 7 in which a saponified natural rubber latex was used, the fuel efficiency was remarkably improved, and, despite the absence of mastication, better processability was also achieved compared with Comparative Examples 1, 2, and 5 in which mastication was preliminarily performed.

The invention claimed is:

1. A composite, formed from a compound latex prepared by mixing a natural rubber latex with a dispersion of surface-treated silica formed from a water glass, the surface-treated silica having an average particle size of not larger than 100 nm and having a chemically-treated surface, wherein the surface of the silica is chemically treated with a compound containing a sulfur-containing functional group which is reactive with a double bond in a rubber of the natural rubber latex.

2. The composite according to claim 1, wherein the functional group containing sulfur is a mercapto group.

3. The composite according to claim 1, wherein a rubber of the natural rubber latex has a phosphorus content of not more than 200 ppm.

4. The composite according to claim 1, wherein a rubber of the natural rubber latex has a nitrogen content of not more than 0.3 mass %.

5. The composite according to claim 1, wherein the natural rubber latex is a modified natural rubber latex prepared by saponification of a natural rubber latex.

6. The composite according to claim 1, wherein the surface-treated silica in the dispersion of surface-treated silica has an average particle size of not larger than 20 nm.

7. A method for producing the composite according to claim 1, the method comprising the steps of:
(I) preparing a dispersion of finely divided silica from a water glass;
(II) chemically treating a surface of the finely divided silica in the dispersion with a compound containing a sulfur-containing functional group which is reactive with a double bond in a rubber of the natural rubber latex to prepare a dispersion of surface-treated silica;
(III) mixing the dispersion of surface-treated silica with the natural rubber latex to prepare a compound latex; and
(IV) coagulating the compound latex.

8. The method according to claim 7, wherein
the dispersion of finely divided silica is prepared by adjusting an aqueous solution of the water glass to a pH of 9 to 11 with an ion exchange resin, and
the silica in the dispersion has an average particle size of not larger than 20 nm.

9. A rubber composition, comprising the composite according to claim 1.

10. A pneumatic tire, formed from the rubber composition according to claim 9.

\* \* \* \* \*